United States Patent [19]

Gueguin

[11] Patent Number: 5,389,355

[45] Date of Patent: * Feb. 14, 1995

[54] METHOD OF PREPARING A SYNTHETIC RUTILE FROM A TITANIFEROUS SLAG CONTAINING ALKALINE EARTH METALS

[75] Inventor: Michel Gueguin, Tracy, Canada

[73] Assignee: QIT-Fer et Titane, Inc., Montreal, Canada

[*] Notice: The portion of the term of this patent subsequent to Jun. 12, 2007 has been disclaimed.

[21] Appl. No.: 130,580

[22] Filed: Dec. 9, 1987

[51] Int. Cl.$^6$ .............. C01G 23/00; C01G 23/047; C01G 23/07

[52] U.S. Cl. ......................... 423/610; 72/74; 72/81; 72/82; 72/83; 423/84; 423/85; 423/609; 423/608; 423/595

[58] Field of Search .............. 423/74, 81, 82, 83, 423/84, 85, 609, 610; 75/1 T; 501/136, 137, 138, 139

[56] References Cited

U.S. PATENT DOCUMENTS

| | | | |
|---|---|---|---|
| 2,701,180 | 2/1955 | Krchma | 23/87 |
| 2,747,987 | 5/1956 | Daubenspeck et al. | 423/79 |
| 2,784,058 | 3/1957 | Hair | 23/87 |
| 2,852,362 | 9/1958 | Daubenspeck et al. | 75/2 |
| 2,974,009 | 3/1961 | Bashour | 23/87 |
| 3,074,777 | 1/1963 | Cortes | 23/87 |
| 3,359,065 | 12/1967 | Zirngibl et al. | 23/87 |
| 3,423,178 | 1/1969 | Willcox | 23/202 |
| 3,457,037 | 7/1969 | Aramendia et al. | 23/202 |
| 3,529,933 | 9/1970 | Honchar | 23/202 |
| 3,647,414 | 3/1972 | Nilsen | 75/1 |
| 3,787,556 | 1/1974 | Piccalo et al. | 423/77 |
| 3,865,920 | 2/1975 | Dunn, Jr. | 423/74 |
| 3,926,615 | 12/1975 | Lailach et al. | 423/72 |
| 3,929,962 | 12/1975 | Shiah | 423/83 |
| 3,950,489 | 4/1976 | Fukushima | 423/74 |
| 4,019,898 | 4/1977 | Chen et al. | 423/82 |
| 4,038,363 | 7/1977 | Jarish | 423/82 |
| 4,078,039 | 3/1978 | Gueguin | 423/74 |
| 4,117,076 | 9/1978 | Gueguin | 423/78 |
| 4,176,159 | 11/1979 | Paixao et al. | 423/80 |
| 4,199,552 | 4/1980 | Rado | 423/82 |
| 4,225,564 | 9/1980 | Tolley | 423/81 |
| 4,533,530 | 8/1985 | Hartmann | 423/481 |
| 4,562,048 | 12/1985 | Moles et al. | 423/81 |
| 4,576,636 | 3/1986 | Robinson et al. | 423/75 |
| 4,629,607 | 12/1986 | Gueguin | 423/74 |

OTHER PUBLICATIONS

Kirk-Othmer's Encyclopedia of Chemical Technology 3rd Ed. vol. 23 pp. 143–148.

The Condensed Chemical Dictionary, 9th Ed., Van Nostrand Reinhold Company p. 662.

*Primary Examiner*—R. Bruce Breneman
*Assistant Examiner*—Matthew Whipple
*Attorney, Agent, or Firm*—Benesch, Friedlaner, Coplan & Aronoff

[57] ABSTRACT

Synthetic rutile is prepared from titaniferous slags containing alkaline-earth metal impurities, such as magnesium oxide, by a method comprising contacting the slag with chlorine at a temperature of at least about 800° C., and then leaching the chlorine-treated slag with hydrochloric acid at a temperature of at least about 150° C.

13 Claims, No Drawings

METHOD OF PREPARING A SYNTHETIC RUTILE FROM A TITANIFEROUS SLAG CONTAINING ALKALINE EARTH METALS

BACKGROUND OF THE INVENTION

1. Field of the Invention

This invention pertains to a method of preparing synthetic rutile from a titaniferous slag containing at least one alkaline earth metal by a two-step method comprising contacting the slag with chlorine at a high temperature, and subsequently contacting the chlorine-treated slag with hydrochloric acid at an elevated temperature.

2. Description of the Prior Art

Titanium dioxide is a white pigment widely used in the paint, paper and plastic industries. Presently this pigment is manufactured by either one of two processes, the classical sulfate process or the relatively new chloride process. Both processes are described in some detail in Kirk-Othmer's *Encyclopedia of Chemical Technology*, 3rd Edition, Vol. 23 at pp. 143-148. Although the sulfate process is the dominant source of titanium pigment today, the chloride process is growing more rapidly because it is more energy efficient and less environmentally difficult. However, the feedstock requirements for the chloride process are more demanding, generally requiring rutile-grade material for operation.

Rutile is a naturally occurring mineral which contains 90 or more percent titanium dioxide, and it can be used as a feedstock in the chloride process with little, if any, upgrading. Unfortunately, rutile is in relatively scarce supply.

High grade ilmenite beach sand is also a natural occurring mineral (containing 60 or more percent titanium dioxide), and it can too be used as a feedstock in the chloride process with little, if any, upgrading. Unfortunately while more abundant than rutile, this mineral is also in relatively scarce supply.

Medium grade (50-55 percent titanium dioxide) and low grade (less than 50 percent titanium dioxide) ilmenite beach sands are considerably more abundant than either rutile or high grade ilmenite beach sand, but neither can be used in the chloride process without being upgraded. Upgrading is usually accomplished by one of two processes, i.e. thermo-reduction followed by acid-leaching, or electro-smelting. Both of these processes reduce the amount of iron and other impurities in the ilmenite beach sand.

Rock ilmenite (37-45 percent titanium dioxide) is the most abundant source of naturally occurring titanium dioxide, but it cannot be used as a feedstock for the production of titanium pigment without first being upgraded. Rock ilmenite is usually upgraded by electro-smelting which is effective for removing the iron values and producing a concentrate known as a titaniferous slag. The titanium values present in the slag are principally in the form of titanium dioxide ($TiO_2$) and titanium sesquioxide ($Ti_2O_3$), and the iron values principally in the form of ferrous oxide (FeO) and metallic iron ($Fe°$). While electro-smelting removes enough iron values from the rock ilmenite to render the slag suitable as a feedstock for the sulfate process, it usually does not remove enough magnesium and calcium values to render the slag suitable as a feedstock for the chloride process. Consequently only that rock ilmenite naturally low in alkaline earth metal values, particularly magnesium, will produce slags suitable as a feedstock for the chloride process. Slags produced from rock ilmenites naturally high in alkaline earth metal values are generally only suitable as feedstocks for the sulfate process unless further upgraded to reduce the alkaline earth metal content.

As is well known, the chloride process is a fluid-bed process and the presence of too much magnesium, like too much iron, will promote the formation of paste-like condensates of magnesium chloride which will eventually clog the reaction bed, conduits, valves and other elements of the equipment. Consequently, abundant rock ilmenite is not available as a source of feedstock for the chloride process unless it is either naturally low in magnesium or the magnesium content is lowered through processing.

Daubenspeck and McNeil teach in U.S. Pat. No. 2,747,987 a process for selectively chlorinating a slag containing reduced titanium values by first reducing the slag to particulate size, and then contacting it with chlorine gas in a static or moving bed operation at a temperature between 550° and 950° C. The chlorine reacts with the iron oxide in the slag to produce volatile ferric chloride, and thus reduces the iron content of the slag. Daubenspeck and McNeil neither discuss the need for nor a method of reducing the magnesium values in the slag. In addition, the process is not autogenous and preheating the feedstock in the substantial absence of free oxygen is necessary (as disclosed by Gueguin in U.S. Pat. No. 4,629,607). This process is best applied to low-magnesium oxide containing slags since relatively small amounts of that impurity are actually chlorinated, and some of the titanium values are lost because they are converted into titanium tetrachloride.

The titanium values in these products, contain a significant portion of the titanium as reduced titanium. As here used, the terms "reduced titanium" and "reduced titanium values" mean low valent titanium values and are definitive of titanium compounds and complex compositions in which the titanium values are present in the trivalent or divalent state.

SUMMARY OF THE INVENTION

According to this invention, synthetic rutile suitable for use as a feedstock in the chloride process is prepared from a titaniferous slag containing an oxide of at least one alkaline earth metal and with at least some portion of its titanium values as $Ti_2O_3$ by a method comprising:
  A. contacting the slag with chlorine at a temperature of at least about 800° C; and
  B. contacting the chlorine-treated slag of (A) with hydrochloric acid at a temperature of at least about 150° C.

The method of this invention reduces the alkaline earth metal oxide content of the slag without significant loss of the titanium values. In another embodiment, the synthetic rutile can be further upgraded by subjecting it to a caustic leach which will reduce the amount of silica and calcia impurities.

DETAILED DESCRIPTION OF THE INVENTION

Any titaniferous slag (frequently referred to here and in the claims as simply "slag") containing an oxide of at least one alkaline earth metal and with at least some portion of its titanium values as $Ti_2O_3$ can be upgraded to synthetic rutile by the method of this invention. As here used, "alkaline earth metal(s)" are those elements that form Group II A of the Periodic Table (as published at page 662 of *The Condensed Chemical Dictionary*, 9th Ed., by Van Nostrand Reinhold Company), e.g. magnesium, calcium, strontium, and barium; and for purposes of this invention, "slag" also includes the product from the upgrading of ilmenite beach sands of any grade or rock ilmenite by thermo-reduction followed by acid-leaching or rusting.

Characteristic of the preferred slags is the presence of magnesium values, typically magnesium oxide, of at least about 1 weight percent, typically of at least about 1.2 weight percent. Preferably the molecular ratio of the reduced titanium ($Ti_2O_3$) to the iron oxide (FeO) in the slag is at least about one. More preferably, the molecular ratio of $Ti_2O_3$ to FeO plus magnesium oxide (MgO) is at least about 1. This allows for a sufficient reaction between the reduced titanium and the ferrous and magnesium oxides present in the slag, i.e.

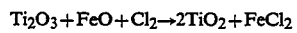

$Ti_2O_3 + FeO + Cl_2 \rightarrow 2TiO_2 + FeCl_2$

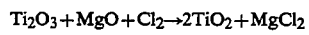

$Ti_2O_3 + MgO + Cl_2 \rightarrow 2TiO_2 + MgCl_2$

The slag is usually produced by electro-smelting either medium- or low-grade ilmenite beach sand or rock ilmenite ore, and it is preferably sized to suitable dimensions for fluidization since one of the principal purposes of this invention is to produce a feedstock suitable for use in the chloride process, which is a fluid-bed process.

The slag is preheated in an inert or substantially oxygen-free atmosphere to a temperature of at least about 800° C. preferably at least about 850° C. The inert or substantially oxygen-free atmosphere is desired to promote retention of the $Ti_2O_3$ content which otherwise is converted into $TiO_2$ as described in U.S. Pat. No. 4,629,607. The slag is then contacted with chlorine gas, preferably preheated to or near the same temperature as the slag in either in a fixed- or fluid-bed configuration. Due to the reaction kinetics of the chlorine gas, a fluid-bed configuration is preferred. In such a configuration, the chlorine is preferably diluted with nitrogen or some other inert gas to insure a gas velocity sufficient to keep the slag in a fluidized state. In a preferred embodiment, the molar ratio of nitrogen and chlorine is between about 5:1 to 1:2.

Once chlorine contacts the slag, the temperature of the reaction mass rises very quickly, typically by more than about 100° C., and the iron content is distilled as iron chlorides. Various amounts of other impurities are also chlorinated but to a much lesser extent.

The chlorination process can be performed in either a batch or continuous mode and if in a continuous mode, the chlorine-treated (or simply "treated") slag is typically discharged from an overflow opening in the reaction vessel and requires continuous monitoring of the slag and chlorine feeds.

After chlorination, the product is typically cooled to room temperature. The particle size distribution of the treated slag does not change appreciably during the chlorination reaction, and it is substantially free of titanium sesquioxide ($Ti_2O_3$). The small amount of iron still present in the product is in the trivalent state and combined with some titanium dioxide to form pseudo-brookite ($Fe_2O_3 \cdot TiO_2$). The majority of the titanium is in the rutile form, the remaining titanium combined with impurities as titanates, essentially aluminum and magnesium titanates ($Al_2O_3 \cdot TiO_2$ and $MgO \cdot 2TiO_2$). The removal of iron from the slag by chlorination results in a product with a porous texture and a radically changed crystal structure. This in turn makes it easier to remove the titanates from the treated slag particles.

The treated slag is then mixed with hydrochloric acid in a suitable pressure vessel under elevated temperature and pressure. The amount of acid used is sufficient to combine with the impurities to form soluble chlorides and is preferably at least about a 20% excess over the stoichiometric requirements. The strength of the acid can vary to convenience but the molarity is usually at least about 5 and preferably at least about 10.

The temperature at which the treated slag and hydrochloric acid are mixed or contacted is an elevated temperature, i.e. a temperature in excess of ambient temperature. Temperatures of at least about 150° C. are preferred with temperatures of at least about 190° C. more preferred. Practical considerations are the only limitations on the maximum temperature that can be used in this step but preferably the temperature does not exceed about 240° C. and more preferably it does not exceed about 220° C.

Pressure is important to this invention only as it relates to temperature and thus it can vary widely. Typically, the invention is practiced at superatmospheric pressure, and the pressure developed from the vapor pressure of the hydrochloric acid and treated slag is preferred.

The required contact time between the treated slag and hydrochloric acid will vary with the conditions and especially with the concentration of the acid and the temperature and pressure employed. The treated slag and hydrochloric acid are contacted for a sufficient period of time to allow a thorough leaching of the impurities from the treated slag particles. The reaction mass is then cooled and depressurized (assuming use of elevated pressure), and the leached material (synthetic rutile) is recovered and washed with water, dried and calcined to remove remaining traces of water.

If desired, the synthetic rutile can be further upgraded by a caustic leaching which liberates silicon and calcium oxide which can then be removed by a subsequent acid wash.

The following are illustrative embodiments of this invention.

SPECIFIC EMBODIMENTS

I. Description of Tests and Analysis

The components of all samples were identified through standard X-ray, wet titration or atomic absorption analysis. The amount of titanium dioxide present in a given sample was identified by a modified LaPorte method of analysis. Unless indicated to the contrary, all parts and percentages are by weight, and all reduced titanium values are expressed as $TiO_2$. The pressure generated within the leach vessel was about 500 psi at 190° C. and between 650 and 700 psi at 210° C.

EXAMPLE 1

Titaniferous slag was sized to $-595 + 105$ microns ($-28 + 150$ mesh). Part of the slag was contacted with air at 1000° C. for 5 hours. Part of this oxidized slag was further contacted with carbon monoxide gas containing 15% hydrogen by volume at 1000° C. for an additional hour. A sample (30 grams) of each of the 3 slags (Sample No. 1 = untreated slag, Sample No. 2 = oxidized with air, and Sample No. 3 = oxidized with air and then reduced with carbon monoxide and hydrogen) was then contacted with 20 grams of a 36% hydrochloric acid solution for 70, 71 and 65 hours respectively inside a Teflon ™-lined pressure vessel placed in an oven heated to 190° C. After cooling, the solids were recovered. The liquor from the Sample No. 1 had a violet color indicative of solubilized trivalent titanium ion, while the liquors of sample Nos. 2 and 3 were brownish in color indicative of ferric chloride. The non-treated material was tightly aglomerated and very difficult to remove from the vessel while the other samples yielded loose solids. The weight losses of Sample Nos 1, 2 and 3 were 14.1% 18.5% and 17.8% respectively.

The compositions of the solids were determined after they were washed, dried and calcined for 5 minutes at 1000° C. These compositions along with the composition of the starting titaniferous slag are reported below in Table I.

TABLE I

Effect of Oxidation on the Leaching of Magnesium Oxide from a Titaniferous Slag with Hydrochloric Acid

|  | $TiO_2$ | $Ti_2O_3$ | FeO | Fe° | $Fe_2O_3$ | $Al_2O_3$ | MgO | CaO | MnO | $SiO_2$ | $Cr_2O_3$ | $V_2O_5$ |
|---|---|---|---|---|---|---|---|---|---|---|---|---|
| Slag | 78.9 | 17.9 | 10.5 | 0.47 | — | 3.30 | 5.21 | 0.31 | 0.27 | 2.06 | 0.18 | 0.61 |
| Sample No. 1 | 87.8 | — | — | — | 3.77 | 3.04 | 2.28 | 0.28 | 0.12 | 1.96 | 0.20 | 0.59 |
| Sample No. 2 | 94.6 | — | — | — | 0.76 | 1.41 | 0.10 | 0.23 | 0.04 | 2.23 | 0.10 | 0.57 |
| Sample No. 3 | 94.4 | — | — | — | 0.50 | 1.77 | 0.35 | 0.20 | 0.03 | 1.94 | 0.13 | 0.52 |

The titanium dioxide losses were 4.4% for Sample No. 1, essentially zero for Sample No. 2, and 0.9% for Sample No. 3.

The experimental runs of this example demonstrate that the oxidation step of this invention enhances the results of the leach step, although in this particular example the leach times were relatively long. Sample No. 3 demonstrates that further reduction of an oxidized slag does not materially improve the leaching efficiency.

EXAMPLE 2

Two samples (20 grams each) of a titaniferous slag were separately leached with a 36% solution of hydrochloric acid (14 grams) in a Teflon ™-lined pressure vessel which was placed in an oven heated to 190° C. for 4 hours. The first sample of slag was untreated while the second sample was oxidized by roasting in air at 1000° C. for 5 hours. The compositions of the samples were determined after the solids were recovered from the leached liquor, washed with water, dried and calcined for 5 minutes at 1000° C. The compositions of the sample and of the original slag are reported in Table II.

TABLE II

Effect of Oxidation on the Removal of Magnesium Oxide from a Titaniferous Slag by Leaching with Hydrochloric Acid

|  | $TiO_2$ | $Ti_2O_3$ | FeO | Fe° | $Fe_2O_3$ | $Al_2O_3$ | MgO | CaO | MnO | $SiO_2$ | $Cr_2O_3$ | $V_2O_5$ |
|---|---|---|---|---|---|---|---|---|---|---|---|---|
| Slag | 77.5 | 16.5 | 11.0 | 0.46 | — | 3.78 | 4.97 | 0.38 | 0.27 | 2.57 | 0.21 | 0.57 |
| Sample No. 1 | 86.2 | — | — | — | 3.50 | 3.10 | 2.90 | 0.35 | 0.16 | 3.00 | 0.22 | 0.50 |
| Sample No. 2 | 86.4 | — | — | — | 3.80 | 2.70 | 2.70 | 0.36 | 0.17 | 3.10 | 0.19 | 0.60 |

Sample No. 1 was comprised of about 24% −200 mesh particles.

Sample No. 2 did not contain any appreciable amount of fines. The magnesium value level of both samples was about 50% of that in the starting slag.

The experimental runs of this Example demonstrate that although the magnesium oxide content of the slag can be significantly reduced by an HCl leach without first oxidizing the slag (Sample No. 1), the reduction is accompanied by an unacceptable loss of titanium values (the −200 mesh particles). By first oxidizing the slag (Sample No. 2), an even greater reduction in the magnesium oxide content is achieved without any appreciable loss of titanium values.

EXAMPLE 3 a. Chlorination (first step)

Titaniferous slag (100 grams) was sized to −297+105 microns (−48+150 mesh) and placed in a vertical silica-tube (25 mm inside diameter) with a porous plate which served both as a support for the sample and as a gas distributor. The sample was heated to 950° C. with an electric tube furnace while flushing the tube with nitrogen at a flow rate of 1400 ml/min. Chlorine was then added to the fluidized charge at a rate of 400 ml/min. The temperature rose to 1052° C. within 10 minutes. The chlorine charge was stopped when traces of chlorine gas appeared in the outlet gas (approximately 13 minutes after the first introduction of chlorine gas). The sample was then cooled to room temperature, discharged from the tube, leached with water and dried. The product composition and the composition of the starting slag are reported in Table III.

TABLE III

Effect of High-Temperature Fluid-Bed Chlorination on the Removal of Magnesium Oxide from a Titaniferous Slag

|  | $TiO_2$ | $Ti_2O_3$ | FeO | Fe° | $Fe_2O_3$ | $Al_2O_3$ | MgO | CaO | MnO | $SiO_2$ | $Cr_2O_3$ | $V_2O_5$ |
|---|---|---|---|---|---|---|---|---|---|---|---|---|
| Slag | 81.4 | 20.25 | 8.97 | 0.12 | — | 2.91 | 5.27 | 0.20 | 0.27 | 1.98 | 0.18 | 0.64 |
| Treated | 86.0 | — | — | — | 3.00 | 2.89 | 5.30 | 0.22 | 0.14 | 1.75 | 0.19 | 0.47 |

TABLE III-continued

| | Effect of High-Temperature Fluid-Bed Chlorination on the Removal of Magnesium Oxide from a Titaniferous Slag | | | | | | | | | | | |
|---|---|---|---|---|---|---|---|---|---|---|---|
| | $TiO_2$ | $Ti_2O_3$ | FeO | Fe° | $Fe_2O_3$ | $Al_2O_3$ | MgO | CaO | MnO | $SiO_2$ | $Cr_2O_3$ | $V_2O_5$ |
| Slag | | | | | | | | | | | | |

The sample weight loss was 6.21% and the titanium dioxide loss was about 0.9%. The particle size of the material remained unchanged but due to the high-temperature (above 800° C.), fluid-bed technique, the level of magnesium oxide in the slag was not reduced.

b. Hydrochloric Acid Leach (second step)

Two samples (20 grams each) of the treated slag were then leached by the same procedure used in Example 2 (4 hours at 190° C. with 36% HCl) except 13 grams of HCl solution were used instead of 14 grams. After cooling, water washing, and drying, the weights were 18.41 and 18.43 grams respectively. The second sample was then placed in a Teflon ™-lined beaker and leached with boiling 1 Normal sodium hydroxide (65 ml) for 4 hours. After separation from the liquor, the final weight of the sample was 17.79 grams. The composition of the two samples are reported in Table IV (the composition of the starting slag and treated slag are also reported in Table IV for comparison purposes).

TABLE IV

| | Effect of Hydrochloric Acid and Hydrochloric Acid and Sodium Hydroxide Leach on the Removal of Magnesium Oxide from a Chlorinated Titaniferous Slag | | | | | | | | | | | |
|---|---|---|---|---|---|---|---|---|---|---|---|
| | $TiO_2$ | $Ti_2O_3$ | FeO | Fe° | $Fe_2O_3$ | $Al_2O_3$ | MgO | CaO | MnO | $SiO_2$ | $Cr_2O_3$ | $V_2O_5$ |
| Slag | 81.4 | 20.25 | 8.97 | 0.12 | — | 2.91 | 5.27 | 0.20 | 0.27 | 1.98 | 0.18 | 0.64 |
| Treated Slag | 86.0 | — | — | — | 3.00 | 2.89 | 5.30 | 0.22 | 0.14 | 1.75 | 0.19 | 0.47 |
| Sample No. 1 HCl treated | 93.8 | — | — | — | 0.86 | 1.36 | 1.28 | 0.22 | 0.06 | 1.87 | 0.10 | 0.27 |
| Sample No. 2 HCl + NaOH treated | 95.3 | — | — | — | 0.89 | 1.09 | 1.28 | 0.05 | 0.05 | 0.77 | 0.10 | 0.27 |

The experimental runs reported in Table IV demonstrate the positive effect of the hydrochloric acid leach on removing magnesium oxide from the treated slag. In addition, following the hydrochloric acid leach with a caustic leach removed significant the amounts of calcium oxide and silicon oxide. These leaches were accomplished without any significant change to the size of the slag particles.

EXAMPLE 4

The composition of the titaniferous slag and the chlorination procedure used in this Example were the same as that used in Example 3. Two samples (20 grams each) of the treated slag were then leached using the same procedure as in Example 3 except that the leach temperature of the second sample was 210° C. The sample lost 6.27% of its weight during chlorination, while the weight losses of Samples No. 1 and 2 during the leach were 7.7% and 9.3% respectively. The caustic leach was omitted for both samples. The compositions of the treated slag and the two samples after leaching are reported in Table V (the composition of the starting slag is also repeated for comparison purposes).

TABLE V

| | Effect of Temperature on the Removal of Magnesium Oxide from a Chlorinated Titaniferous Slag by Hydrochloric Acid Leaching | | | | | | | | | | | |
|---|---|---|---|---|---|---|---|---|---|---|---|
| | $TiO_2$ | $Ti_2O_3$ | FeO | Fe° | $Fe_2O_3$ | $Al_2O_3$ | MgO | CaO | MnO | $SiO_2$ | $Cr_2O_3$ | $V_2O_5$ |
| Starting Slag | 81.4 | 20.25 | 8.97 | 0.12 | — | 2.91 | 5.27 | 0.20 | 0.27 | 1.98 | 0.18 | 0.64 |
| Treated Slag | 85.8 | — | — | — | 3.29 | 2.88 | 5.25 | 0.27 | 0.16 | 1.78 | 0.19 | 0.48 |
| Leach @ 190° C. | 92.6 | — | — | — | 1.20 | 1.43 | 1.40 | 0.21 | 0.07 | 1.98 | 0.10 | 0.34 |
| Leach @ 210° C. | 96.4 | — | — | — | 0.50 | 1.02 | 0.51 | 0.07 | 0.04 | 0.78 | 0.07 | 0.29 |

The data of this table demonstrate the efficacy of this invention in removing magnesium oxide from a titaniferous slag. Again, simple high-temperature chlorination of the slag does not have any material effect on the removal of magnesium oxide but when followed with an hydrochloric acid leach, the amount of magnesium oxide in the treated slag is substantially reduced. Comparison of the compositions of the two leached samples shows that a small increase in temperature has a measurable effect on the amount of magnesium, calcium and silicon oxides removed from the treated slag over the same period of time.

Although this invention has been described in considerable detail by the above examples, the detail is provided for the purpose of illustration only and is not to be construed as a limitation upon the scope of this invention as described in the following claims.

What is claimed is:

1. A method of preparing synthetic rutile from a titaniferous slag containing FeO, $Ti_2O_3$ and an oxide of at least one alkaline earth metal and where the molecular ratio of $Ti_2O_3$ to FeO is at least about 1, the method comprising:
   a) contacting the titaniferous slag with chlorine gas at a temperature of at least about 800° C. such that at least some of the alkaline earth metal oxide is converted to an alkaline earth metal titanate; and
   b) contacting the chlorine-treated slag of (a) with hydrochloric acid at a temperature of at least about 150° C.

2. The method of claim 1 wherein the oxide of an alkaline earth metal is magnesium oxide.

3. The method of claim 2 where the titaniferous slag before contacting with the chlorine gas contains at least about 1 weight percent magnesium oxide.

4. The method of claim 2 where the titaniferous slag before contacting with the chlorine gas contains at least about 1.2 weight percent magnesium oxide.

5. The method of claim 3 where the molecular ratio of $Ti_2O_3$ to FeO plus MgO in the titaniferous slag before contacting with the chlorine gas is at least about 1.

6. The method of claim 5 where the titaniferous slag before contacting with the chlorine gas is sized to a dimension suitable for fluidization.

7. The method of claim 6 where the titaniferous slag before contacting with the chlorine gas is preheated in an inert atmosphere before being contacted with chlorine.

8. The method of claim 7 where the chlorine is diluted with nitrogen.

9. The method of claim 5 where the hydrochloric acid of step (b) is present in at least about a 20% stoichiometric excess over the alkaline earth metal titanate formed in step (a).

10. The method of claim 9 where the molarity of the hydrochloric acid is at least about 5.

11. The method of claim 10 where the temperature in step (b) is at least about 190° C.

12. The method of claim 11 where the chlorine-treated slag and hydrochloric acid are contacted at a pressure in excess of atmospheric pressure.

13. The method of claim 1, 10 or 12 where the product of step (b) is leached with sodium hydroxide.

* * * * *